(12) United States Patent
Naoe

(10) Patent No.: US 7,172,819 B2
(45) Date of Patent: Feb. 6, 2007

(54) METHOD FOR PRODUCING MAGNETIC RECORDING MEDIUM

(75) Inventor: Koji Naoe, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/601,631

(22) Filed: Jun. 24, 2003

(65) Prior Publication Data

US 2004/0009293 A1    Jan. 15, 2004

(30) Foreign Application Priority Data

Jun. 25, 2002    (JP) .............................. 2002-184195

(51) Int. Cl.
  B05D 3/00    (2006.01)
  B05D 5/12    (2006.01)

(52) U.S. Cl. ...................... 428/565; 427/128; 427/600

(58) Field of Classification Search ................ 428/323, 428/694 BA; 427/127, 565
See application file for complete search history.

(56) References Cited

U.S. PATENT DOCUMENTS

| | | | |
|---|---|---|---|
| 4,728,405 A * | 3/1988 | Kaneko ....................... 427/565 |
| 5,064,687 A * | 11/1991 | Matsufuji et al. ............ 427/132 |
| 5,576,075 A * | 11/1996 | Kawasaki et al. ........... 427/565 |
| 6,241,376 B1 * | 6/2001 | Schunemann et al. ........ 366/99 |
| 6,641,891 B2 * | 11/2003 | Doushita et al. ............ 428/65.3 |
| 6,680,088 B2 * | 1/2004 | Naoe et al. .................. 427/565 |
| 6,827,968 B2 * | 12/2004 | Naoe ........................... 427/122 |
| 2002/0045067 A1 * | 4/2002 | Masaki et al. ......... 428/694 BS |

FOREIGN PATENT DOCUMENTS

| | | |
|---|---|---|
| JP | 8-194935 A | 7/1996 |
| JP | 2000-044932 (A) | 2/2000 |
| JP | 2000-354751 (A) | 12/2000 |

OTHER PUBLICATIONS

Aya Asa, "Stirring Technology in 21st Century", *Japanese Industrial Standards*, Nov. 20, 2000, pp. 41-61.
Japanese Office Action issued Aug. 21, 2006 for related foreign application.

* cited by examiner

*Primary Examiner*—Holly Rickman
(74) *Attorney, Agent, or Firm*—Sughrue Mion, PLLC

(57) ABSTRACT

In the method for producing a magnetic recording medium having a nonmagnetic substrate coated with a magnetic coating material containing a ferromagnetic powder and a binder, the magnetic coating material contains a liquid A constituted by the ferromagnetic powder and a solvent, and a solution B of the binder, and the liquid A and the solution B are mixed together by a thin-layer revolving-type fast stirring apparatus, and are thereafter subjected to dispersion processing. Thereby, coagulated particles of the ferromagnetic powder can be dispersed and the coagulation of the ferromagnetic powder can be prevented, thus making it possible to obtain a liquid of ferromagnetic powder with uniform adsorption of the binder. As a result, a magnetic coating material suitable for a low-noise high-density coating-type magnetic recording medium is obtained.

2 Claims, 2 Drawing Sheets

METHOD FOR PRODUCING MAGNETIC RECORDING MEDIUM

BACKGROUND OF THE INVENTION

1. Field of the Invention

The present invention relates to a method for producing a magnetic recording medium, and particularly to a method for producing a low-noise and high-density coating-type magnetic recording medium.

2. Description of the Related Art

For increasing the density of the magnetic recording medium, the method of increasing the tape length (reducing the tape thickness) to increase the volume recording density, and the method of reducing the track width to increase the area recording density have been generally used in many systems as for tape-shaped media.

Consequently, the reduced tape thickness has caused the problem of insufficient edge strength of tapes, thus bringing about a situation in which substrates of materials that have higher strength and are more expensive than conventional products must be used. Also, a servo technique has been developed for accommodating the recently adopted method of reducing the track width, but this technique is difficult to apply particularly in a linear-type system, and the cost of development is considerably be increased.

Methods other than those described above include the method of increasing the linear recording density as a method for increasing the density, but this method has been avoided because of the considerable reduction in C/N (carrier output/noise ratio) associated with short-wave recording.

Recently, an increasing number of systems have adopted high-sensitivity MR heads as playback heads as a method for increasing the density. In this case, reduction of the medium noise and extreme reduction in thickness of the magnetic layer are required for the magnetic recording medium. It can be considered that a finely granulated and uniformly distributed magnetic material is used, and the magnetic material is uniformly dispersed in preparation of a liquid as the method for reducing the medium noise.

In the conventional liquid preparation method, however, the initial contact of the magnetic material with a binder is achieved by a kneader or the like. In this case, since the coagulated magnetic material powder and the solution containing a high concentration of binder are mixed with a high shear force applied thereto, there arise problems such that the wettability of the magnetic material is reduced and hence the dispersibility of the magnetic material is compromised, and the coagulation of the magnetic material formed by kneading cannot be dispersed after it is dispersed, if a magnetic material of fine particles is used. Also, there is a problem that the coagulation of the magnetic material causes not only a noise source but also defects such as seams in coating of an extremely thin magnetic layer.

SUMMARY OF THE INVENTION

The object of the present invention is to solve the above problems of the prior art and provide a low-noise high-density coating-type magnetic recording medium.

In order to attain the above-described object, the present invention is directed to a method for producing a magnetic recording medium having a nonmagnetic substrate coated with a magnetic coating material containing a ferromagnetic powder and a binder, wherein: the magnetic coating material contains a liquid A constituted by the ferromagnetic powder and a solvent, and a solution B of the binder; and the liquid A and the solution B are mixed together by a thin-layer revolving-type fast stirring apparatus, and are thereafter subjected to dispersion processing.

According to the present invention, since the liquid A constituted by a ferromagnetic powder and a solvent can be mixed with the solution B of binder by the thin-layer revolving-type fast stirring apparatus, coagulated particles of the ferromagnetic powder can be dispersed and the coagulation of the ferromagnetic powder can be prevented, thus making it possible to obtain a liquid of ferromagnetic powder with uniform adsorption of the binder. As a result, a magnetic coating material suitable for a low-noise high-density coating-type magnetic recording medium is obtained.

That is, as the particle size of the magnetic material decreases, the surface area of the magnetic material increases. Consequently, the ferromagnetic powder more likely coagulates when the raw material is prepared. The coagulated magnetic material has air trapped therein, but it is difficult to remove the air instantaneously when it initially contacts the binder solution because the magnetic material has a large surface area, and thus the surface of the magnetic material is not sufficiently wetted.

Generally, there is the method in which by granulation such as compaction, deaeration in the powder is promoted to improve the wettability at the time of contact with the solution, but the method has a disadvantage that compaction with a fine particle magnetic material causes coagulation that is difficult to be dispersed in the subsequent processing of dispersion of the magnetic coating material.

If the method for preparation of the magnetic coating material of the present invention is used, both the dispersing of coagulation of the ferromagnetic powder and the uniform mixing of the ferromagnetic powder and the binder can be performed at a time by the thin-layer revolving-type fast stirring apparatus, thus making it possible to create a state in which the size of secondary coagulation is reduced, and the binder is uniformly absorbed on the surface of the magnetic material. As a result, a magnetic coating material such that the amount of coagulated mass occurring after dispersion processing is not significant, and no magnetic materials are bound together magnetically can be prepared.

Furthermore, the "thin-layer revolving-type fast stirring apparatus" is a high-speed stirring apparatus in which a stirrer having a diameter slightly smaller than the inner diameter of a cylindrical stirring tank is placed coaxially in the stirring tank, a small amount of processing object liquid is supplied to the stirring tank, and the stirrer is rotated at a high speed to stir this processing object liquid while it is made to rise in such a manner that it is formed into a shape of thin-layer cylinder, wherein a circulation passage with a buffer tank, a liquid delivery pump and a cooler connected in series is provided between a discharge port and a supply port of the stirring tank for the processing object liquid, and a drain valve for the processing object liquid is provided in the circulation passage.

In the conventional high-speed stirring apparatus, cavitation occurs when the circumferential speed is 20 m/second or greater, and no more shear force can be applied to the processing object liquid. On the other hand, according to the thin-layer revolving-type fast stirring apparatus, the cavitation associated with a centrifugal force can be controlled to perform fast stirring at a circumferential speed of 25 m/second or greater.

Such a stirring apparatus is disclosed in Japanese Patent Application Publication Nos. 2000-354751, 2000-44932 and the like, and is introduced in documents such as "Stirring Technology in 21st Century" (written by Aya Asa, Nov. 20, 2000, Japanese Industrial Standards). Commercially available apparatuses include, for example, Fill Mix (trade name) manufactured by Tokushukikako Industry Co., Ltd.

In the present invention, it is preferable that the liquid A is subjected to dispersion processing by applying an ultrasonic wave thereto before the liquid A and the solution B are mixed together. If the liquid A is subjected to dispersion processing before the liquid A and the solution B are mixed together in this way, the effect of the present invention can be exhibited more reliably.

That is, as described previously, the thin-layer revolving-type fast stirring apparatus has a high-performance stirring function, but does not have a high function for dispersing a ferromagnetic powder. On the other hand, if the liquid A subjected to dispersion processing by applying an ultrasonic wave thereto is mixed with the solution B, a remarkable effect can be obtained along with the stirring function by the thin-layer revolving-type fast stirring apparatus.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
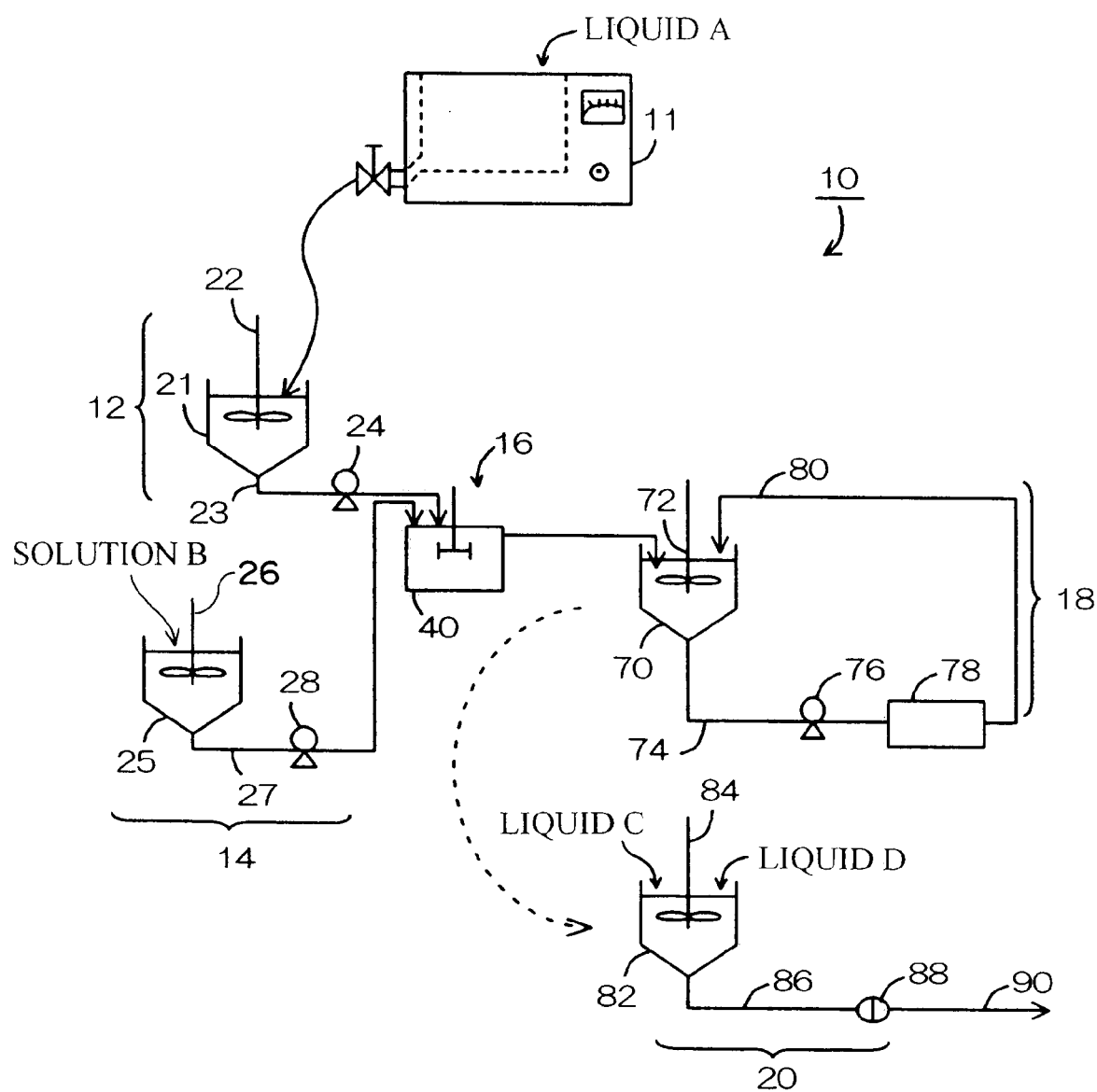
FIG. 1 is an overall block diagram of a production apparatus for a magnetic coating material for use according to an embodiment of the present invention.
Figure 2:
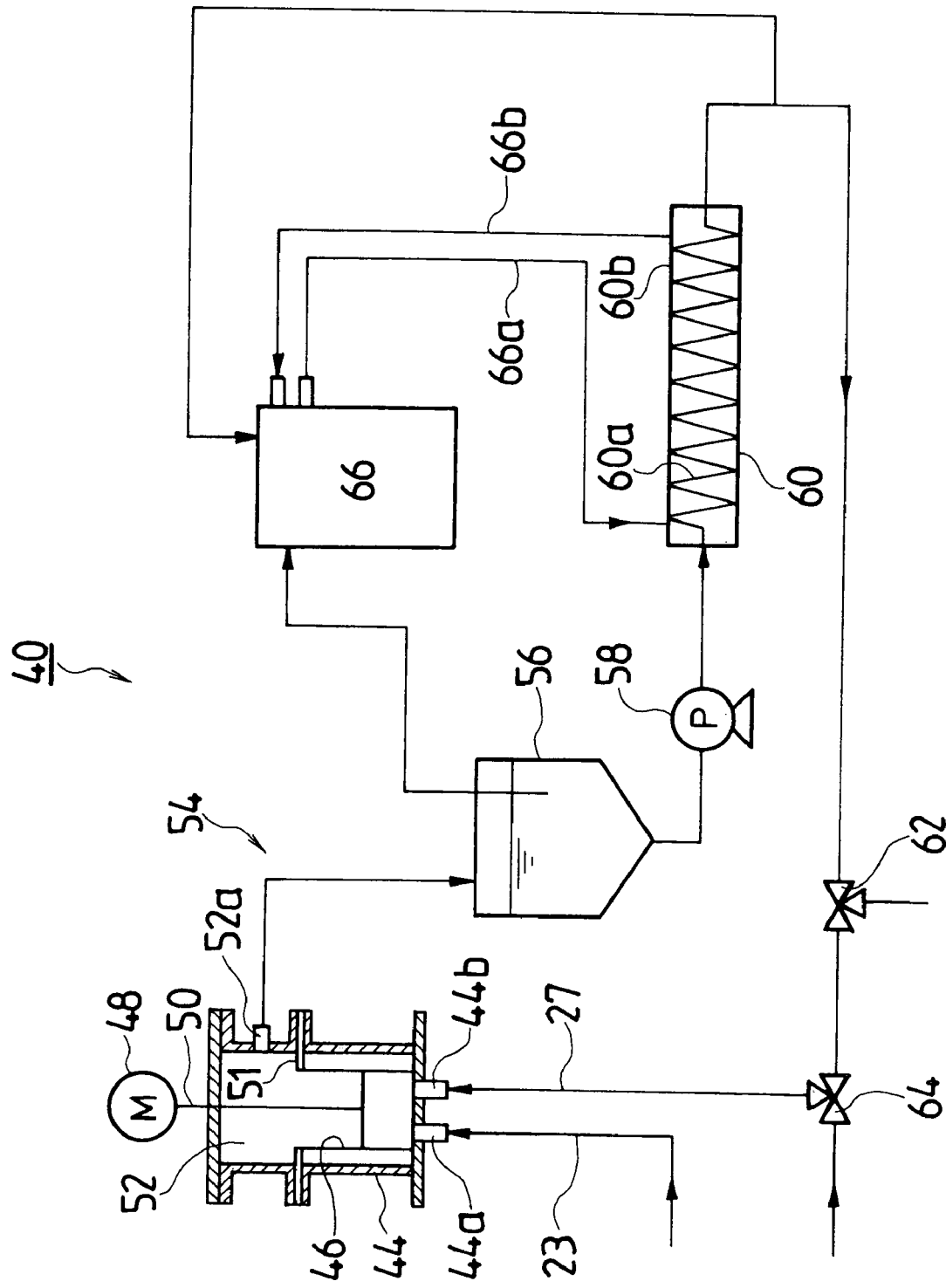
FIG. 2 is a schematic sectional view of a thin-layer revolving-type fast stirring apparatus for use in a thin-layer revolving-type fast stirring system.

A preferred embodiment of a production apparatus 10 for a magnetic coating material for use in a method for producing a magnetic recording medium according to the present invention will be described below based on the accompanying drawings. FIG. 1 is an overall block diagram of the production apparatus 10 for the magnetic coating material, and FIG. 2 is a schematic sectional view of a thin-layer revolving-type fast stirring apparatus 40 for use in a thin-layer revolving-type fast stirring system 16.

The production apparatus 10 for the magnetic coating material is constituted by an ultrasonic dispersion apparatus 11 for liquid A, a liquid A supplying system 12, a solution B supplying system 14, the thin-layer revolving-type fast stirring system 16, a sand mill dispersion system 18 and a magnetic coating solution preparing system 20 in this order from the upstream. The liquid A supplying system 12 and the solution B supplying system 14 are placed side by side, and are arranged so that a liquid A and a solution B are each supplied to the thin-layer revolving-type fast stirring system 16.

The ultrasonic dispersion apparatus 11 for liquid A is an apparatus for dispersing the liquid A constituted by a ferromagnetic powder and a solvent by applying an ultrasonic wave thereto before the liquid A and the solution B are mixed together, and may have any of a batch-type processing form and a flow-type processing form. In other words, the apparatus may have any form as long as the liquid concentration, and the frequency, the irradiation area, the number of circulations and the like in ultrasonic dispersion can be set so that cavities (voids) generated in ultrasonic dispersion processing can be assigned in larger quantity and more uniformly to the ferromagnetic powder immersed in the solvent. The ultrasonic dispersion apparatus 11 for liquid A shown in the drawing has a batch-type processing form.

In the case where the ultrasonic dispersion apparatus 11 for liquid A has a batch-type processing form, a frequency of 15 to 1000 kHz can suitably be employed as an ultrasonic frequency. A high frequency is preferable in terms of the number of generated cavities, while a low frequency is preferable in terms of explosive power of generated cavities. In this respect, by using ultrasonic dispersion processing of different frequencies in combination, the coagulated magnetic material can be dispersed more effectively.

If ultrasonic dispersion processing is carried out with a single frequency, the magnetic material can be dispersed by spending a predetermined amount of time (power consumption) at a frequency of 20 to 40 kHz. If the frequency of 20 kHz is compared with the frequency of 40 kHz, the frequency of 40 kHz is more preferable in that the irradiation area is more likely increased, and a larger number of cavities in the liquid are generated and fractured. For the batch-type ultrasonic dispersion apparatus with the frequency of 40 kHz, a various kinds of commercially available ultrasonic cleaners and the like may be used. The manufacturer and the like are not specifically limited.

When ultrasonic dispersion processing is carried out with the batch-type processing form, it is preferable that the unprocessed liquid A is put in a closed container made of glass, plastic or the like having a diameter smaller than the ultrasonic irradiation area, and the container is placed on an ultrasonic irradiation part. Also, if the unprocessed liquid A is put in a container having a diameter larger than the ultrasonic irradiation area, the liquid is more preferably stirred by a stirrer.

In the case where the ultrasonic dispersion apparatus 11 for liquid A has a flow-type processing form, the frequency of the commercially available ultrasonic dispersion apparatus for flow processing is generally around 20 kHz. Thus, it is preferable that the number of circulations of the liquid A is secured, and thereby the number of generated and fractured cavities in the liquid is secured to promote the dispersing of the coagulated magnetic material. Also, the configuration may be employed such that a plurality of ultrasonic dispersion apparatuses 11 for liquid A are arranged in series. Also, the processing is preferably carried out at a higher flow rate as a measure against settlement of the magnetic material.

For this type of ultrasonic dispersion apparatus, for example, a flow-type ultrasonic dispersion apparatus (trade name: US-1200TCVP) manufactured by Nippon Seiki Co., Ltd. may be used. For the specifications of this apparatus, the frequency is 20 kHz, the MAX amplitude is 30 µm, the rated output is 1200 W, the space between the irradiation part and a holder is 3 mm, and so on. This ultrasonic dispersion apparatus has an ultrasonic irradiation zone having a circular shape with the diameter of 50 mm, which is more preferable in that a larger irradiation area can be provided.

The liquid A supplying system 12 for supplying the liquid A and the solution B supplying system 14 for supplying the solution B are each constituted by a liquid tank, a liquid supplying device and the like. Specifically, the liquid A supplying system 12 is constituted by a liquid tank 21, a stirrer 22 with its leading end placed in the liquid tank 21, and a liquid supplying pipe 23 from the liquid tank 21 and a liquid supplying pump 24. Similarly, the solution B supplying system 14 is constituted by a liquid tank 25, a stirrer 26 with its leading end placed in the liquid tank 25, a liquid supplying pipe 27 from the liquid tank 25 and a liquid supplying pump 28.

For various kinds of constituent members for use in the liquid A supplying system 12 and the solution B supplying system 14 described above, a various kinds of well known members may be used. However, materials causing no contamination and corrosion are preferably employed in consideration of the nature specific to the magnetic coating material for the magnetic recording medium.

The thin-layer revolving-type fast stirring apparatus 40 is provided in the thin-layer revolving-type fast stirring system 16 shown in FIG. 1. By providing this thin-layer revolving-type fast stirring apparatus 40, coagulated particles of the ferromagnetic powder can reliably be dispersed, and the ferromagnetic powder subjected to dispersion processing in the ultrasonic dispersion apparatus 11 for liquid A and the binder can be mixed together uniformly.

This thin-layer revolving-type fast stirring apparatus 40 is a well known apparatus presented in patent publications, documents and the like as described previously; however, there have been no cases where the apparatus is applied for production of the magnetic coating material as in the present invention, although there have been cases where it is used in production of an abrasive and the like. The inventor of the present invention has found that unprecedented remarkable effect can be obtained by combining the thin-layer revolving-type fast stirring apparatus 40 with the method in which the liquid A constituted by the ferromagnetic powder and the solvent, which is one of liquids stirred by the thin-layer revolving-type fast stirring apparatus 40 is previously subjected to dispersion processing.

In FIG. 2, the thin-layer revolving-type fast stirring apparatus 40 comprises a cylindrical stirring tank 44 and a stirrer 46, and the stirrer 46 is driven by a motor 48 via a drive axis 50. Liquid supplying pipes 23 and 27 are connected to supply ports 44a and 44b in the bottom part of the stirring tank 44, a ring plate-shaped sheathing board 51 and an upper chamber 52 are provided in the upper part of the stirring tank 44, and a discharge port 52a is provided in the upper chamber 52.

Circulation passage 54 for the processing object liquid is provided between the discharge port 52a and the supply port 44b, this circulation passage 54 is provided with a buffer tank 56, a liquid delivery pump 58, a cooler 60, a three-way drain valve 62 and a transfer valve 64, and the leading end of the drain valve 62 provided in the downstream is attached to a liquid tank 70 of the sand mill dispersion system 18 (see FIG. 1). The volume of the buffer tank 56 may be several times as large as the volume of the processing object liquid formed into a shape of thin-layer cylinder in the stirring tank 44.

The cooler 60 has a form such that for example, a coil-shaped inner pipe 60a allowing the processing object liquid to flow therethrough is enclosed in a case 60b, and a cooling medium is circulated in the case 60b, and the cooling medium is cooled by a cooling system 66 and circulated through passages 66a and 66b. The configuration of the cooler 60 can be changed according to the properties of the processing object liquid, and a configuration such that the inner pipe 60a serves as a passage for the cooling medium and the case 60b serves as a passage for the processing object liquid, and other different forms are acceptable.

The stirring tank 44 is surrounded by a water cooled chamber, and is cooled by cooling water flowing through a water cooled pipe (not shown). The stirrer 46 has a cylindrical part having a large number of pores, an arm and a boss, and is coupled to the drive axis 50 by the boss. As described previously, the sheathing board 51 and the upper chamber 52 are mounted on the upper part of the stirring chamber 44, and the discharge port 52a is coupled thereto. A water cooled chamber is also provided in the upper chamber 52, and coiling water is circulated through a water cooled pipe (not shown). The size of the stirring tank 44 may optionally be set, but for production of small batches of a variety of products, for example, the stirring tank 44 having an inner diameter of 80 mm and the stirrer 46 having an outer diameter of 76 mm may be used. The stirrer 46 is not limited to that described above, but any type of stirrer such as a wire type with a large number of wires provided in a radial form and a gear type with projections and depressions formed on the outer face may be used.

In the thin-layer revolving-type fast stirring apparatus 40, when the stirrer 46 is driven at a circumferential speed equal to or greater than 40 to 50 m/second while the processing object liquid (liquid A and solution B) is supplied from the liquid supplying pipes 23 and 27, the processing object liquid undergoes a revolving force from the stirrer 46 and revolves, and is abutted against the inner face of the stirring tank 44 by a centrifugal force to rise, and flows from the inner periphery to the outer periphery of the cylindrical part of the stirrer 46 through pores of the stirrer 46, and the position of the inner peripheral surface of the processing object liquid is restricted by the inner peripheral surface of the sheathing board 51, and thereby the entire liquid is formed into a shape of thin-layer cylinder. By this movement, the processing object liquid rubs against the inner peripheral surface of the stirring tank 44 and the inner and outer surfaces of the stirrer 46, and also rubs against the inner faces of pores of the stirrer 46, and whereby the processing object liquid undergoes a stirring force while generating frictional heat, and its temperature rises to near the boiling point of water in about 10 seconds.

In the stirring tank 44, when the supply of the processing object liquid is continued, a part of liquid undergoing the rise in temperature jumps over the sheathing board 51 into the upper chamber 52, continues to revolve along the inner face thereof by an inertia force and forms into a cylindrical shape, and is then discharged from the discharge port 52a. The discharged processing object liquid enters the circulation passage 54, and is temporarily stored in the buffer tank 56 to be cooled (to be left standing to cool). When the buffer tank 56 is almost filled with the processing object liquid, the delivery of liquid is stopped to stop the supply of the processing object liquid, and the transfer valve 64 is switched to the side of the circulation passage 54 to activate the liquid delivery pump 58. Consequently, the processing object liquid in the buffer tank 56 is fed to the cooler 60 and forcefully cooled down to, for example, 10° C. there, and is passed through the liquid supplying pipe 27 and returned to the stirring tank 44 to be stirred again.

That is, the processing object liquid repeatedly undergoes fast stirring for a short time, and cooling for a longer time. Thus, for obtaining a material having a desired particle size, the above cumulative time may be determined by experiment, and the processing object liquid may be circulated through the circulation passage 54 until this cumulative time is reached.

For the thin-layer revolving-type fast stirring apparatus 40 described above, for example, Fill Mix (trade name) Type: 80-50 manufactured by Tokushukikako Industry Co., Ltd. described previously may be used. For the specifications of this apparatus, the inner diameter of the stirring tank 44 is 80 mm, the volume of the stirring tank 44 is 370 ml, the outer diameter of the stirrer 46 is 76 mm and so on, and the stirrer 46 has a cylindrical part having a large number of pores each having a diameter of 5 mm.

The stirrer 46 of the thin-layer revolving-type fast stirring apparatus 40 preferably has a cylindrical part having a large number of pores as described above, and the total area of the large number of pores relative to the total area of the cylindrical part (i.e. numerical aperture) is preferably 30% or greater, more preferably 50% or greater. The shape of the large number of pores is not limited to a circular shape, but may be a square, rectangle, rhombus or the like. Also, for the arrangement of the large number of pores, they are preferably distributed uniformly.

In FIG. 1, the sand mill dispersion system 18 placed in the downstream of the thin-layer revolving-type fast stirring system 16 is constituted by a liquid tank 70, a stirrer 72 with its leading end placed in the liquid tank 70, a liquid supplying pipe 74 from the liquid tank 70 and a liquid supplying pump 76, a sand mill dispersion apparatus 78, and a return pipe 80 from the sand mill dispersion apparatus 78 to the liquid tank 70.

In this sand mill dispersion system 18, a liquid flowing from the thin-layer revolving-type fast stirring system 16 is repeatedly circulated by the sand mill dispersion apparatus 78, and a part thereof is supplied to the magnetic coating solution preparing system 20 in the downstream.

This sand mill dispersion system 18 is intended for further dispersing the ferromagnetic powder of the mixture of the liquid A and the solution B, and for various kinds of constituent members for use in the system, various kinds of well known members may be used. However, materials causing no contamination and corrosion are preferably employed in consideration of the nature specific to the magnetic coating material for the magnetic recording medium.

The magnetic coating solution preparing system 20 placed in the downstream of the sand mill dispersion system 18 is constituted by a liquid tank 82, a stirrer 84 with its leading end placed in the liquid tank 82, a liquid supplying pipe 86 from the liquid tank 82, a filter 88, and a pipe 90 from the filter 88. Also, in the liquid tank 82, a liquid C constituted by a lubricant and a solvent, and a liquid D being an additive solution (constituted by carbon black and an abrasive) are newly added.

In the magnetic coating solution preparing system 20, the magnetic coating material is finally prepared, and is passed through the filter 88, whereby contaminants are removed, the magnetic coating material is supplied for a coating step.

The production of the magnetic coating material using the production apparatus 10 for the magnetic coating material will now be described. For the ferromagnetic powder for use in the present invention, various kinds of materials may be used, but if the ferromagnetic powder is a hexagonal ferrite, a material with the plate diameter of preferably 10 to 50 nm, more preferably 10 to 35 nm, and the plate ratio of 2 or greater may be used, and if the ferromagnetic powder is a ferromagnetic metal powder, a material with the major axis length of preferably 16 to 100 nm, more preferably 10 to 60 nm, and the axis ratio of 2 or greater may be used. For the particle size of this ferromagnetic powder, a material with the average primary particle volume of 10,000 $nm^3$ or smaller may suitably be used.

In the liquid A, the solvent in which the ferromagnetic powder is immersed is preferably a solution containing a cyclohexanone. The content of cyclohexanone is preferably 30 to 100% by weight of the total amount of solvent. For the solution other than cyclohexanone, methyl ethyl ketone, toluene, butyl acetate or the like is preferably used.

The liquid concentration of the liquid A is preferably 5 to 80% by weight, more preferably 10 to 50% by weight, further preferably 25 to 50% by weight. The upper limit of the liquid concentration is defined by permeability, and the lower limit of the liquid concentration is defined by the effect of ultrasonic dispersion.

The liquid A subjected to ultrasonic dispersion processing by the ultrasonic dispersion apparatus 11 for liquid A is put in the liquid tank 21 of the liquid A supplying system 12, and is stirred by the stirrer 22.

In the solution B supplying system 14, the concentration of solution B of binder is preferably set so that it has a liquid viscosity of 10 Pa·s (100 P) or lower, more preferably 1 Pa·s (10 P) or lower, most preferably 0.1 Pa·s (1 P) or lower by vismetron.

The ratio of the binder of the magnetic material in the solution B when the liquid A is mixed with the solution B is preferably 0.5 to 30 parts by weight, more preferably 2 to 15 parts by weight of binder relative to 100 parts by weight of magnetic material. Also, in consideration of assurance of film strength, assurance of dispersion and so on, it is preferable that a necessary binder is added in midstream depending on the dispersion level in the sense that the dispersion efficiency can be improved.

The action of the thin-layer revolving-type fast stirring apparatus 40 will now be described. The processing of the processing object liquid (liquid A and solution B) in the thin-layer revolving-type fast stirring apparatus 40 may be batch processing.

In this case, for example, 250 ml of mixture of the liquid A and the solution B is stirred at a high speed. The circumferential speed reaches 50 m/second in about 10 seconds from the start of stirring. After this state is maintained for 2 seconds, the rotation is stopped. If the circumferential speed is 50 m/second, it takes about 10 seconds until the rotation is stopped. Thereafter, cooling water at about 7° C. is made to flow into the cooler 60 at a flow rate of 35 liters/minute, and the mixture is stirred at a low circumferential speed of 5 m/second for 30 seconds to cool the mixture. The above processing is repeated five times so that cumulative time of fast stirring (circumferential speed of 50 m/second) reaches 10 seconds.

In the thin-layer revolving-type fast stirring apparatus 40, the processing object liquid (liquid A and solution B) is pushed against the inner wall of the stirring tank 44 by a centrifugal force to form a thin layer with the thickness of about 12 to 18 mm. This thin-layer forms into a circulation fluid by upper and lower revolving streams when contacting the inner wall of the stirring tank 44.

On the other hand, the stirrer 46 is designed so that it cuts across in the thin layer, and the revolving stream of the processing object liquid under processing passes through a large number of pores of the stirrer 46, and thereby repeatedly collides against the inner wall of the stirring tank 44 many times. By this collision, coagulated particles are dispersed to reduce the cluster size. Also, the dispersed particles are rolled on the inner wall face of the stirring tank 44 by the revolving stream of the processing object liquid, and are thereby subjected to rolling and granulation.

According to the mechanism described above, two types of particles, namely dispersed particles and granulated particles, are mixed uniformly while the dispersing of coagulation and granulation are repeated in the mixture containing particles of the ferromagnetic powder and the binder.

According to the mechanism of the thin-layer revolving-type fast stirring apparatus described above, it is preferable that a fast stirring condition (e.g. circumferential speed of 50 m/second) is reached in short time in the sense that particles can be collided against the inner wall of the stirring tank 44 under a great centrifugal force to increase a dispersing force. It is also preferable that the amount of retention time after a certain fast stirring condition (e.g. circumferential speed of 50 m/second) is reached is reduced in the sense that the rolling and granulation can be controlled and the vaporization of the solvent due to an increase in liquid temperature can be controlled. The retention time is preferably 0 to 30 seconds, more preferably 0 to 10 seconds.

That is, by repeating the processing on an intermittent basis with the retention time limited to a short period (e.g. 2 seconds as described previously), the collision power of particles colliding against the inner wall of the stirring tank 44 can be advantageously enhanced to increase the number of collisions.

In contrast to this, if the amount of the retaining time is increased, the liquid temperature rises, and the viscosity of liquid is increased to reduce the flowability due to solvent enclosure during rolling and granulation. If the flowability of liquid is reduced, there arises a problem such that the capability of dispersing particles is compromised. The rise in liquid temperature can be ascribed to the processing object liquid shifting on the inner wall of the stirring tank 44, and undergoing a shear force by the stirrer 46 to generate heat.

In the fast stirring condition (e.g. circumferential speed of 50 m/second), it is preferable that the processing object liquid is kept at a high temperature as long as the liquid temperature does not exceed the boiling point of the solvent in the sense that the flowability of the processing object liquid can be ensured. That is, for this purpose, cooling water is prevented from flowing into the cooler 60.

On the other hand, after the fast stirring condition is reached, cooling water is made to flow into the cooler 60 to cool the processing object liquid, and stirring is carried out at a low speed (e.g. circumferential speed of 5 m/second), whereby the dispersibility of particles can be improved.

In stirring in the thin-layer revolving-type fast stirring apparatus 40, the liquid temperature rises with the stirring as described previously, but given that the liquid temperature in the fast stirring condition (e.g. circumferential speed of 50 m/second) equals Tk, the liquid temperature Tk is set so that Tg of the binder of the solution B satisfies the following inequality 1, thereby making it possible to improve the level of adsorption between the ferromagnetic powder particles and the binder during fast stirring.

$$Tg-50° C.<Tk<Tg+30° C. \quad \text{(inequality 1)}$$

Also, by satisfying the above inequality, the adsorption between the ferromagnetic powder particles and the binder when coagulated particles are not yet well dispersed just after the starting of stirring can be controlled.

If nonmagnetic powder particles are also used in the present invention, it is preferable that there is a difference in specific gravity between the nonmagnetic powder particles and the solvent of the processing object liquid. Specifically, given that the specific gravity of the solvent of the processing object liquid equals hy, and the specific gravity of the nonmagnetic powder particles equals hf, it is preferable that hf is larger than hy, and the following inequality 2 is satisfied.

$$hf-hy \geq 0.5 \text{ g/ml} \quad \text{(inequality 2)}$$

In this way, as the difference between the specific gravity hf of the nonmagnetic powder particles and the specific gravity hy of the solvent of the processing object liquid is increased, the collision force of the nonmagnetic powder particles colliding against the inner wall of the stirring tank 44 by a centrifugal force is enhanced.

Various kinds of well known methods of production may be employed for production of the magnetic recording medium by the magnetic coating material obtained by the production apparatus 10 for the magnetic coating material. For example, for the method for coating the magnetic coating material, the roller coating method, the dip coating method, the fountain coating method and the like may be employed for the application type, and the air knife coating method, the blade coating method, the bar coating method and the like may be employed for the measurement method. Also, for the method of dealing with the application type and the measurement type in the same part, the extrusion coating method, the slide bead coating method, the curtain coating method and the like may be employed.

The magnetic layer of the produced magnetic recording medium preferably has a thickness of 0.02 to 3 μm, more preferably 0.02 to 0.2 μm in dry state. Also, the layer composition is preferably such that a nonmagnetic layer having mainly a nonmagnetic powder and a binder is provided between the magnetic layer and a nonmagnetic substrate. Particularly, the composition in which the magnetic layer is a thin layer has not only an advantage that a reduction in C/N in the shortwave range is prevented to improve the medium performance but also an advantage that productivity can be improved because the level of coating seams associated with the dispersing of the coagulated magnetic material can be reduced.

The illustrative embodiment of the method for producing the magnetic recording medium according to the present invention has been described above, but the present invention is not limited to the above illustrative embodiment, and various kinds of aspects may be adopted.

For example, a batch processing type is employed as the ultrasonic dispersion apparatus 11 for liquid A in this illustrative embodiment, but a flow-type ultrasonic dispersion apparatus or the like may be employed.

Also, in the sand mill dispersion system 18, the sand mill dispersion apparatus 78 is employed, but a various kinds of other types of dispersion devices may be employed. Other types of dispersion devices include such as a dissolver-type stirrer, a homomixer stirrer and a flow-type ultrasonic stirrer.

EXAMPLES

Examples of the present invention will now be described in contrast with Comparative Examples. In each Example described below, the expression of "parts" means "parts by weight".

Each Example described below employs a layer composition in which a nonmagnetic intermediate layer having mainly a nonmagnetic powder and a binder is provided between a magnetic layer and a nonmagnetic substrate.

In Example 1 as an example of the present invention, a magnetic coating material prepared in such a manner that the liquid A constituted by a ferromagnetic powder and a solvent is subjected to dispersion processing by applying an ultrasonic wave thereto in the ultrasonic dispersion apparatus 11 for liquid A of the production apparatus 10 for a magnetic coating material having a configuration shown in FIG. 1, and thereafter the liquid A is mixed with the solution B of a binder and stirred by the thin-layer revolving-type fast stirring apparatus 40, and is thereafter subjected to dispersion processing is used.

On the other hand, in Example 2 as a Comparative Example, a magnetic coating material prepared in such a manner that using as a ferromagnetic powder a barium ferrite having a plate diameter of 26 nm and a plate ratio of 3, the ferromagnetic powder is made to contact a binder solution and kneaded by an open kneader to prepare a liquid, and thereafter the prepared liquid is subjected to dispersion processing in preparation of a magnetic liquid is used.

In Example 3 as a Comparative Example, a magnetic coating material prepared in such a manner that unlike Example 1 (Example of the present invention), the liquid A constituted by a ferromagnetic powder and a solvent and the solution B of a binder are stirred and mixed by a dissolver-type stirrer, and is processed by the sand mill apparatus dispersion processing instead of subjecting the liquid A constituted by a ferromagnetic powder and a solvent to dispersion processing by an ultrasonic wave and stirring by the thin-layer revolving-type fast stirring apparatus 40 is used.

The compositions of Examples 1 to 3 will be described below with common aspects described collectively and different aspects described individually.

(1) Compositions of Nonmagnetic Intermediate Layer (Common in Examples 1 to 3)
nonmagnetic powder $\alpha$-$Fe_2O_3$: 80 parts
  average major axis length: 0.1 μm
  specific surface area based on BET method: 48 $m^2/g$
  pH 8, content of $Fe_2O_3$: 90 percents or greater
  DBP oil adsorption: 27 to 38 ml/100 g
  surface finishing agent: $Al_2O_3$
carbon black: 20 parts
  average primary particle size: 16 μm
  DBP oil adsorption: 80 ml/100 g
  pH: 8.0
  specific surface area based on BET method: 250 $m^2/g$
  volatile component: 1.5%
vinyl chloride copolymer: 8 parts
  MR-110 manufactured by Zeon Corporation
polyester polyurethane resin: 4 parts
  neopentyl glycol/caprolactone polyol/MDI=0.9/2.6/1 containing $1 \times 10^{-4}$ eq/g of $SO_3Na$ base: Tg 65° C.
phenylsulfone acid: 3 parts
butyl stearate: 1 part
stearic acid: 1 part
methyl ethyl ketone: 150 parts
cyclohexanone: 100 parts The coating material of the nonmagnetic intermediate layer described above was prepared by kneading components other than stearic acid and butyl stearate by an open kneader, followed by subjecting the kneaded components to dispersion processing by a pin-type sand mill dispersion apparatus of lateral circulation type (2L type) packed with small-size zirconia beads (diameter of 0.5 mm) with the bead filling factor of 80%, at a pin point circumferential speed of 12 m/second, at a flow rate of 0.5 kg/minute and with dispersion retention time of 60 minutes.

A liquid prepared by adding 3 parts of polyisocyanate to the dispersed liquid, further adding thereto 1 part of stearic acid and 1 part of butyl stearate, and dissolving them with methyl ethyl ketone and cyclohexanone (methyl ethyl ketone:cyclohexanone=36 parts:24 parts) was added and stirred to prepare a nonmagnetic coating solution with the solids content of 28% and the solvent ratio of methyl ethyl ketone:cyclohexanone=6:4. The nonmagnetic coating solution was filtered using a filter having an average pore size of 1 μm and thereby conditioned.

(2) Composition of Magnetic Layer (The Magnetic Liquid and the Additive Solution are Presented. Others are Not Presented)
a) Additive Paste Liquid (additive solution) (common in Examples 1 to 3)
  $\alpha$-alumina (particle size 0.18 μm): 4.5 parts
  carbon black (particle size 0.10 μm): 0.5 parts
  MR 110: 0.45 parts
  Cyclohexanone: 9.2 parts The additive paste liquid had a composition of carbon black:alumina:MR 110: cyclohexanone=5:45:4.5:50.5, and this paste liquid was subjected to two-pass processing at a flow rate of 30 g/minute, apart from the magnetic material, using a flow-type ultrasonic dispersion apparatus (1200 W, the frequency was 20 kHz, the diameter of the surface of the irradiation part was 50 mm, the space between the irradiation part and the holder was 3 mm, the amplitude was 30 μm).

b) Magnetic Liquid (different among Examples 1 to 3)

Example 1

Ferromagnetic powder: 100 parts
  plate diameter: 26 nm
  plate ratio: 3
  average primary particle volume: 3805 $nm^3$
  SBET: 60 $m^2/g$
  pH: 7.9
  Hc: 187856 A/m (2360 Oe)
  σs: 49 $A \cdot m^2/kg$
  true specific gravity: 5.1 g/ml
  apparent specific gravity: 0.7 g/ml
MR 110:10 parts
methyl ethyl ketone: 20 parts
cyclohexanone: 170 parts For preparation of the magnetic coating solution of the Example, the components were blended so that the liquid A had a composition of ferromagnetic powder:cyclohexanone=100 parts:150 parts. As pre-stirring, 100 g of liquid A (mixture) was put in a cylindrical container with the inner diameter of 50 mm (flat bottom, thickness 2 mm, made of glass, height 100 mm, capped-type), and the cylindrical container containing the mixture was placed in an ultrasonic cleaner Model: BRANSONIC 220 manufactured by BRANSON Co., Ltd. (specifications: 125 W, the diameter of irradiation surface of 50 mm and two oscillation parts, frequency 40 kHz) with water introduced therein to process the liquid A.

The cylindrical container was placed just above the oscillation parts of the ultrasonic cleaner, and ultrasonic processing was carried out with in one minute after immersion in a solvent (mixing). The amount of ultrasonic processing time was 30 minutes.

Independently, as the solution B, a binder solution having a composition of MR 110: cyclohexanone:methyl ethyl ketone=10:20:20 (solids content in liquid was 20%) was prepared in advance by the dissolver-type stirrer.

The liquid A and the solution B were mixed and stirred in batch processing using previously described Fill Mix (trade name) Model: 80-50 manufactured by Tokushukikako Industry Co., Ltd. as the thin-layer revolving-type fast stirring apparatus 40.

The first stirring of 250 ml of mixture of the liquid A and the solution B was started. The circumferential speed reached 50 m/second in about 10 seconds after the stirring was started. This state was maintained for 2 seconds, and thereafter the rotation was stopped. For the circumferential speed of 50 m/second, it took about 10 seconds until the rotation was stopped. Thereafter, cooling water at about 7° C. was made to flow into the cooler 60 at a flow rate of 35 liters/minute, and the mixture is stirred at a low circumferential speed of 5 m/second for 30 seconds to cool the mixture. The above processing was repeated five times so that cumulative time of fast stirring (circumferential speed of 50 m/second) reached 10 seconds.

Then, in the sand mill dispersion system 18, the mixture was processed by a pin-type sand mill dispersion apparatus 78 of lateral circulation type (2L type). For the processing conditions, dispersion processing was carried out at a pin point circumferential speed of 10 m/second, at a flow rate of 0.5 kg/minute and with dispersion retention time of 30 minutes, with the dispersion apparatus packed with small-size zirconia beads (diameter of 0.5 mm) with the bead filling factor of 80%.

Example 2

As Comparative Example, using as a ferromagnetic powder a barium ferrite having a plate diameter of 26 nm and a plate ratio of 3, the ferromagnetic powder was made to contact a binder solution kneaded by an open kneader to prepare a liquid, and thereafter the prepared liquid was subjected to dispersion processing in preparation of a magnetic liquid. The proportion of the ferromagnetic powder was same as that of Example 1.

More specifically, the ferromagnetic powder, the binder, methyl ethyl ketone and cyclohexanone were kneaded by the open kneader, followed by subjecting the kneaded components to dispersion processing by a pin-type sand mill dispersion apparatus of lateral circulation type (2L type) packed with small-size zirconia beads (diameter of 0.5 mm) with the bead filling factor of 80%, at a pin point circumferential speed of 10 m/second, at a flow rate of 0.5 kg/minute and with dispersion retention time of 30 minutes.

Example 3

As Comparative Example, the liquid A constituted by a ferromagnetic powder and a solvent and the solution B of a binder were stirred and mixed at a circumferential speed of 18 m/second by the dissolver-type stirrer, and were processed by the sand mill dispersion apparatus. Specifically, the dissolver-type stirrer was coupled to the pin-type sand mill dispersion apparatus of lateral circulation type by piping, the liquid was circulated therethrough at a flow rate of 5 kg/minute to process the liquid for 30 minutes. The proportion of the ferromagnetic powder was same as that of Example 1.

The step of mixing the magnetic liquid of the Examples 1 to 3 and the previously described additive paste liquid to prepare a magnetic coating material in the magnetic coating solution preparing system 20 shown in FIG. 1 will now be described.

The magnetic coating solution and the additive paste liquid were put in the liquid tank 82 of the magnetic coating solution preparing system 20, and was mixed and stirred by the stirrer 84, and a solution with 0.5 parts of stearic acid and 1.5 parts of butyl stearate dissolved by 50 parts of methyl ethyl ketone and 30 parts of cyclohexanone was added and stirred to prepare a magnetic coating (magnetic coating material). The magnetic coating solution was filtered by the filter 88 having an average pore size of 1 μm and thereby conditioned.

A magnetic tape as the magnetic recording medium was produced in the following step. As a nonmagnetic substrate, polyester naphthalate of which the roughness component strength was 0.03 $nm^2$ with the thickness of 5.2 μm and the wavelength of 4.3 μm in the roughness spectral of AFM was used.

Simultaneous double layer coatings were provided on the substrate so that the post-dry thickness of the nonmagnetic layer coating solution was 1.5 μm, and immediately thereafter, a magnetic layer with the post-dry thickness of 0.1 μm was formed thereon. When both the nonmagnetic layer and magnetic layer were still wetted, they were oriented by a cobalt magnet having a magnetic force of 3000 G and a solenoid having a magnetic force of 1500 G and thereby dried, and were thereafter processed at a temperature of 85° C., under a linear pressure of 350 kg/cm and at a speed of 50 m/minute by a seven-stage calendar apparatus composed only of a metal roll, and the substrate was slit into a width of 6.35 mm, thereby producing a magnetic tape.

The magnetic tapes of the Examples 1 to 3 were evaluated for the following two items. That is, the items are the number of masses and the cluster size.

The number of masses was examined by counting the number of flecked masses per predetermined area using an optical microscope. Numbers of masses equivalent to 8 visual fields in the 500 times visual field were summed to determine the number of masses. The area equivalent to 8 visual fields in the 500 times visual field corresponds to 0.1768 $mm^2$.

In Example 1 (Example of the present invention), the number of masses was 0. On the other hand, in Examples 2 and 3 as Comparative Examples, the numbers of masses were 140 and 1, respectively.

The cluster size was measured by MFM (magnetic-force microscope). In Example 1 (Example of the present invention), the cluster size was 7,200 $nm^2$. On the other hand, in Examples 2 and 3 as Comparative Examples, the cluster sizes were 29,000 $nm^2$ and 10,000 $nm^2$, respectively.

If compared the Example of the present invention with Comparative Examples, it can be understood that in Example 1 (Example of the present invention), the number of coagulated flecked masses when observing the surface of the magnetic layer by the optical microscope is small and the magnetized cluster size by MFM is small compared to Example 2 (Comparative Example), and therefore the effect of the present invention can be ascertained.

It can be understood that in Example 3 (Comparative Example), the number of masses is small and the magnetized cluster size by MFM is also small compared to Example 2 (Comparative Example), but it can also be understood that Example 3 is apparently inferior to the Example of the present invention.

As described above, according to the present invention, the liquid A constituted by a ferromagnetic powder and a solvent and the solution B of a binder can be mixed together by the thin-layer revolving-type fast stirring apparatus, thus making it possible to obtain a ferromagnetic powder solution in which coagulated particles of the ferromagnetic powder can be dispersed, the ferromagnetic powder can be prevented from coagulating, and the binder is uniformly adsorbed. Consequently, a magnetic coating material suitable for a low-noise high-density coating-type magnetic recording medium can be obtained.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method for producing a magnetic recording medium having a nonmagnetic substrate coated with a magnetic coating material containing a ferromagnetic powder and a binder, wherein:

the magnetic coating material contains a liquid A constituted by the ferromagnetic powder and a solvent, and a solution B of the binder;

liquid A is subjected to dispersion processing by applying an ultrasonic wave thereto before liquid A and solution B are mixed, liquid A and solution B are mixed together by a thin-layer revolving fast stirring apparatus at a circumferential speed of 25 m/sec or greater, and are thereafter subjected to dispersion processing, and a thin layer of a mixture of liquid A and solution B having a thickness of about 12 to 18 mm is formed when liquid A and solution B are mixed in the apparatus.

2. The method for producing a magnetic recording medium according to claim 1, wherein stirring at a circumferential speed of 40 to 50 m/sec is performed in the apparatus.

* * * * *